United States Patent [19]

Serizawa et al.

[11] Patent Number: 4,504,026
[45] Date of Patent: Mar. 12, 1985

[54] PHOTOGRAPHIC PAPER ROLLING APPARATUS

[75] Inventors: Moriyoshi Serizawa, Hachioji; Haruo Hakamada, Tachikawa, both of Japan

[73] Assignee: Konishiroku Photo Industry Co., Ltd., Tokyo, Japan

[21] Appl. No.: 468,060
[22] PCT Filed: Jun. 11, 1982
[86] PCT No.: PCT/JP82/00227
§ 371 Date: Feb. 8, 1983
§ 102(e) Date: Feb. 8, 1983
[87] PCT Pub. No.: WO82/04484
PCT Pub. Date: Dec. 23, 1982

[30] Foreign Application Priority Data

Jun. 12, 1981 [JP] Japan ................. 56-91102

[51] Int. Cl.$^3$ .............................. G03B 1/04
[52] U.S. Cl. .................... 242/71.1; 242/67.1 R; 242/76
[58] Field of Search ............ 242/67.1 R, 71, 71.1, 242/74, 76, 179

[56] References Cited

U.S. PATENT DOCUMENTS 2,950,873  2/1957  Nelson ................ 242/56 A
3,057,573 10/1962  Kindig ................ 242/71
4,103,841  8/1978  Flynn et al. ......... 242/86.2
4,136,839  1/1979  Walter ............... 242/76
4,218,032  8/1980  Nagel et al. ......... 242/76

OTHER PUBLICATIONS

Agfa-Gevaert A.G., Japanese Patent Laid Open No. 124,725/79, Published 9-27-1979.
Hokushin Electric Works, Ltd., Japanese Utility Model Laid Open No. 11736/74, Published 1-31-1974.
Hitachi Engineering Kabushiki Kaisha, Japanese Utility Model Publication No. 26289/65, Published 9-7-1965.
Mitsubishi Heavy Industries, Ltd., Japanese Patent Publication No. 1126/80, Published 1-11-1980.

Primary Examiner—Stuart S. Levy
Assistant Examiner—Leo J. Peters
Attorney, Agent, or Firm—Jordan B. Bierman

[57] ABSTRACT

Disclosed herein is a photographic paper rolling apparatus wherein at least three rollers 8, 9 and 10 are pressed against the outer periphery of a roll-up shaft 3 for the photographic paper 40, the photographic paper 40 is rolled round the roll-up shaft 3 while being held between the rollers 8, 9, 10 and the roll-up shaft 3, and the rollers 8, 9 and 10 are separated from the rolled-up paper and withdrawn from the roll-up shaft 3 when the photographic paper 40 has been rolled up to some extent and the outer diameter of the roll of paper becomes large.

1 Claim, 5 Drawing Figures

PHOTOGRAPHIC PAPER ROLLING APPARATUS

TECHNICAL FIELD

The present invention relates to a photographic paper rolling apparatus which rolls up the strips photographic paper used in photographic printers.

BACKGROUND ART

In a photographic printer in which a strip of photographic paper is used, the photographic paper which has been exposed is rolled up in a roll-up magazine. In order to roll up the photographic paper in the roll-up magazine, a roll-up shaft is provided inside the magazine, and the photographic paper is rolled round the roll-up shaft. In order to roll the strip of photographic paper round the roll-up shaft, a slot could be provided in the roll-up shaft. The end of the photographic paper is inserted into the slot in the shaft and fixed, and then the paper is rolled up by rotating the roll-up shaft. However, such an operation is apt to be a daylight operation when it is conducted manually, and even when it is conducted as a dark-room operation, a waste of time and photographic materials can not be avoided. When the end of the photographic paper is inserted into the slot of the roll-up shaft, in particular, a fold is made in the end and this part can not be used. Therefore, it has been common practice to roll the photographic paper firmly round the roll-up shaft several times and then roll up the paper later by using the frictional force thereof. In this case, however, it is necessary to confirm the secure rolling of the photographic paper round the roll-up shaft. Many attempts have been made to automate the rolling-up of the printing paper, as described in Japanese Patent Laid-Open No. 124,725/79, from which no satisfactory results have so far been obtained.

DISCLOSURE OF INVENTION

The present invention furnishes a photographic paper rolling apparatus an object of which is to eliminate manual operation and to save time and photographic materials. This object is accomplished by a photographic paper rolling apparatus characterized in that a guide member for the rolling of the photographic paper is provided around a roll-up shaft, in that said guide member is provided with at least three rollers, in that a spring is provided to hold said rollers inward elastically, and in that the guide member which is supported axially by the outer case is withdrawn from the roll-up shaft when a prescribed amount of photographic paper has been rolled up.

BEST MODE FOR CARRYING OUT THE INVENTION

Figure 1:
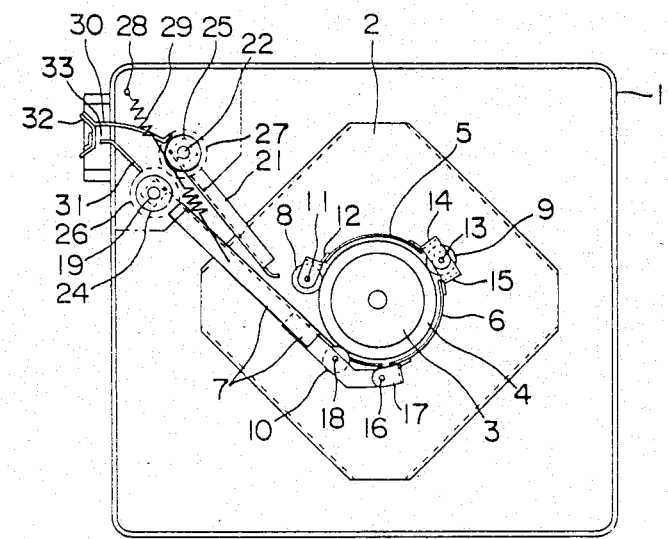
FIGS. 1 and 4 each show a front view of an embodiment of the present invention.

The following is a detailed explanation of the present invention with reference to the drawings.

In the drawings, a roll-up shaft 3 is located near the center of a roll-up magazine case 1, while a flange 2 rotating together with the roll-up shaft 3 is provided behind the roll-up shaft 3. The roll-up shaft 3 is covered by a removable core 4, which rotates together with the shaft 3. Power is transmitted from an external source to the roll-up shaft 3 through a gear wheel 34, and thereby the shaft 3 is rotated in the counterclockwise direction in FIG. 1.

Plate-like roll guides 5 and 6 and a lower-surface guide 7 are placed around the core 4, and the lower-surface guide 7 and the roll guide 6 are connected rotatably to each other by a pin 16 provided in an attachment plate 17, while the roll guides 5 and 6 are connected rotatably to each other by a pin 13. Roller attachment plates 12 and 14 are fixed to the roll guide 5 (a secondary guide means), while a roller attachment plate 15 is fixed to the roll guide 6 (a secondary guide means), and pins 11, 13 and 18 of first roller 8, secondary roller 9 and terminal roller 10, respectively, are supported rotatably by these attachment plates.

The pin 13 is also provided with a pressure spring 36, and the spring force of the pressure spring 36 acts in the direction in which the roll guides 5 and 6 hold down the core 4.

The lower-surface guide 7 is made one with a lower-surface guide attachment block attached to the shaft 19 of an inlet guide roller.

The upper-surface guide 21 is also made one with an upper-surface guide attachment block attached to the shaft 22 of another inlet guide roller, and a spur gear 26 fixed to the shaft 19 of one inlet guide roller engages with a spur gear 27 fixed to the shaft 22 of one of the inlet guide rollers. The rear end of the inlet guide roller shaft 22 extends outside the magazine case 1, and a detection plate 37 is attached to this extenesion. The lower-surface guide 7 is controlled by a tension spring 29 in the direction in which it is pressed against the core 4.

When, before the rolling operation, the lower-surface guide 7 and the roll guides 5 and 6 are set for winding paper around the roll-up shaft 3 as shown in FIG. 1, the detection plate 37 is rotated to a prescribed angle, and a setting completed signal is generated by an external sensor, not shown in the drawings.

Meanwhile, a shutter 32 of the magazine is opened when the magazine is connected to the photographic printer. When the setting completion signal is generated from the external sensor under these conditions, the printing operation is conducted, and the end of the strip of photographic paper passes along the path through the main body of the printer and then passes automatically through the paper introduction port 33 of the magazine. It then passes between an upper inlet guide 30 and a lower inlet guide 31 and, while being guided by guide rollers 24 and 25 and the lower-surface guide 7 and the upper-surface guide 21, is conveyed toward the core 4.

The core 4 is rotated counterclockwise by the external power, while the rollers 8, 9 and 10 rotate in contact with the core 4.

Figure 2A:
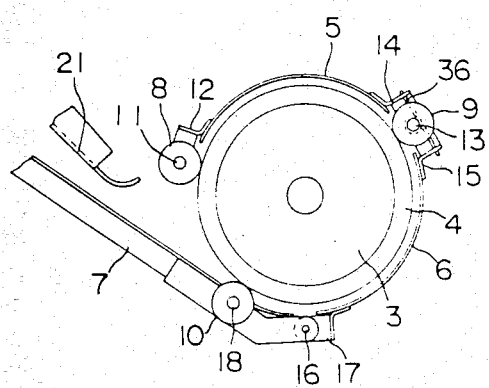
FIGS. 2(a) and 2(b) each show an enlarged view of a roll-up shaft thereof.
Figure 2B:
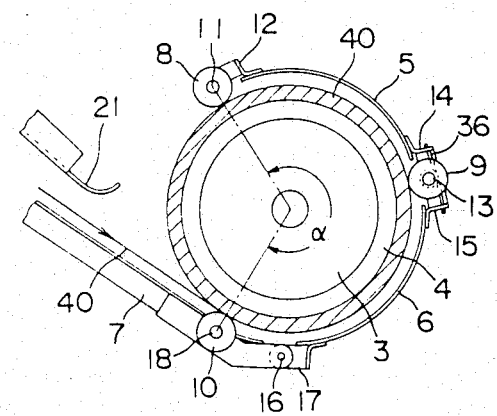
Figure 3:
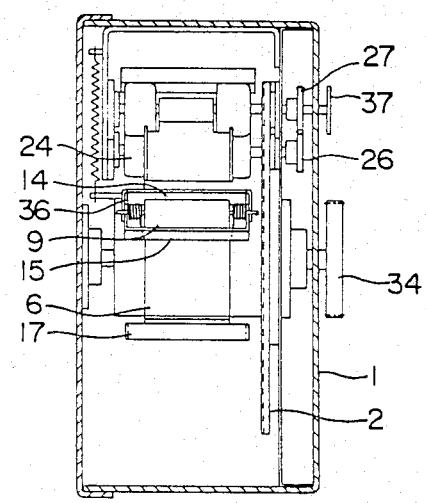
FIG. 3 is a section of the embodiment shown in FIG. 1.

The end of the photographic paper 40 is held between the core 4 and the roller 10 and is then rolled round the core 4 by the rollers 9 and 8. FIG. 2(a) shows the setting state, and FIG. 2(b) shows the state in which the strip of photographic paper has been rolled round the core 4 several times. Since the rollers 8, 9 and 10 operate in such a manner that they are pressed against the core 4 by the action of springs 29 and 36, the photographic paper is rolled firmly round the core 4 and rolled up without being damaged or folded.

As the paper is rolled and the outer diameter of the rolled-up photographic paper 40 becomes larger than that shown in FIG. 2(b), the pressure spring 36 is extended so as to act more strongly and the angle α of the photographic paper 40 between the rollers 8, 9 and 10 becomes smaller. When the rolling proceeds further and the angle α is reduced to close to an angle of 180 degrees, the rollers 8 and 9 withdraw from the outer periphery of the photographic paper 40. The tension spring 29 presses the lower-surface guide 7 against the paper 40 under the condition shown in FIG. 1, the force of the tension spring 29 is adjusted so that it only presses the lower-surface guide 7 with a force sufficient to balance the core 4 against the weight of the guide 7, since the roll guides 5 and 6 are made to hold the core 4 between them by the force of the pressure spring 36.

Accordingly, it becomes impossible to press the lower-surface guide 7 against the core 4 when the rollers 8 and 9 withdraw from the outer peripher of the paper 40 and the weight of the roll guides 5 and 6 are added to the weight of the lower-surface guide 7.

Figure 4:
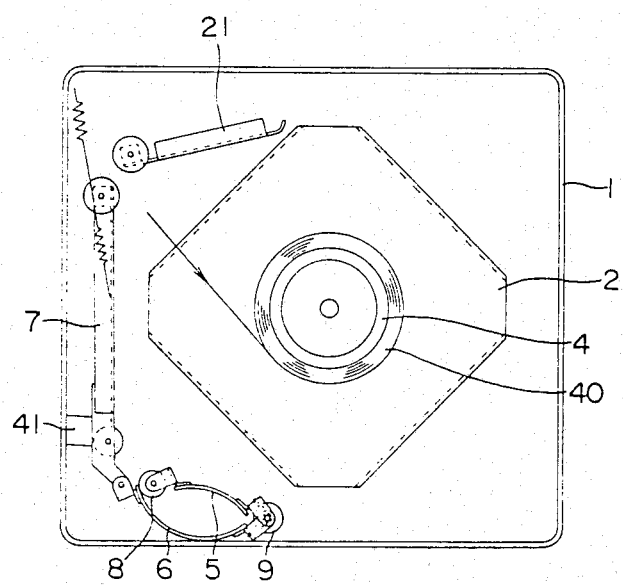

FIG. 4 shows the state in which the rollers 8 and 9 have withdrawn from the photographic paper 40.

The tension spring 29 has the structure of a tumbler whose fulcrums are a spring engagement shaft 28 and the inlet guide roller shaft 19. Therefore, when the lower-surface guide 7 drops to a position beyond the extension of a straight line connecting the spring engagement shaft 28 and the inlet guide roller shaft 19, the spring force acts in the direction in which it presses the lower-surface guide onto a stopper 41, thereby preventing the lower-surface guide 7 from moving freely.

In the meantime, the upper-surface guide 21 is raised through an angle dictated by the movement of the lower-surface guide through the spur gears 26 and 27.

Accordingly, when the lower-surface guide 7 withdraws, the upper-surface guide 21 also withdraws to the position shown in FIG. 4 and thus the strip of photographic paper can be rolled up continuously and securely around the outer periphery of the core 4 without being damaged. The lower-surface guide 7 does not hinder the subsequent rolling-up operation, since it is withdrawn to the corner of the magazine.

INDUSTRICAL APPLICABILITY

As is clear from the above explanation, the apparatus is very easily set into the state shown in FIG. 1, the photographic paper is rolled up automatically, and it is used surely and effectively, including the end thereof, in contrast to the unstable reliability which often accompanies conventional automatic rolling. Thus the advantages of the present invention are very large.

We claim:

1. A photographic paper rolling apparatus comprising
    (a) a paper introduction port,
    (b) a shutter to open and close said port,
    (c) a rotatable core,
    (d) upper and lower guides for directing paper to said rotatable core,
said upper and lower guides being mounted so that they are adapted to rotate in opposite directions to each other, said lower guide having a first roller mounted thereon at a point such that said first roller is contacting the periphery of said core when said lower guide is rotated into a first position, a first urging means for urging said lower guide into said first position, at least one secondary roller and secondary guide member, said secondary roller being attached to said lower guide via said secondary guide member, and a terminal roller attached to the distalmost portion of said secondary guide member, said secondary guide member and said at least one secondary guide roller and said terminal roller encircling said core, said secondary guide member including portions which are moveable relative to each other and toward and away from said core, and second urging means for urging said portions together toward said core, said first urging means being of sufficient force to overcome the weight of said lower guide but of insufficient force to overcome the combined weight of said lower guide, said second urging means, said at least one secondary roller, and said terminal roller, whereby when said lower guide and first roller are urged against said core, said first roller and terminal roller define an angle in excess of 180° around the axis of said core and as said photographic paper winds around said core, said angle decreases toward 180° thereby moving said secondary guide member and secondary roller away from said photographic paper until such time as said at least one secondary roller, secondary guide member and terminal roller fall off said photographic paper thereby forcing said lower guide to rotate in a first direction away from said core into a second position and means for simultaneously rotating said upper guide in a second direction opposite said first direction resulting in free-winding of said paper on said core.

* * * * *